(No Model.)

L. A. WILSON.
Triple Wheel Motor.

No. 239,904. Patented April 5, 1881.

Witnesses
Wm Scott
R. L. Johnson

Inventor
Levi. A. Wilson

UNITED STATES PATENT OFFICE.

LEVI A. WILSON, OF ROLLA, MISSOURI.

TRIPLE-WHEEL MOTOR.

SPECIFICATION forming part of Letters Patent No. 239,904, dated April 5, 1881.

Application filed January 10, 1881. (No model.)

*To all whom it may concern:*

Be it known that I, LEVI A. WILSON, of Rolla, Phelps county, Missouri, have invented a new and useful Improvement in Triple-Wheel Power, of which the following is a specification.

My invention relates to improvements in triple-wheel power; and the objects of my improvements are, first, increase of power; second, protection against breakage of machinery in case of sudden resistance. I attain the objects by the mechanism illustrated in the accompanying drawings, in which—

Figure 1:
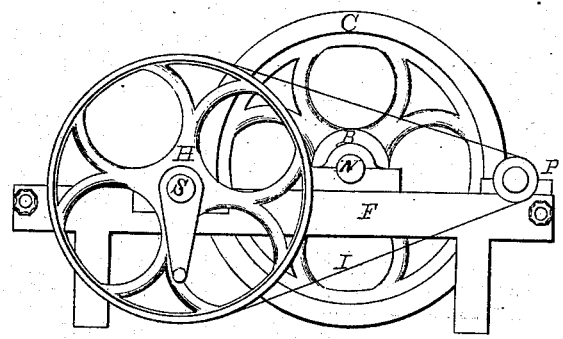
Figure 2:
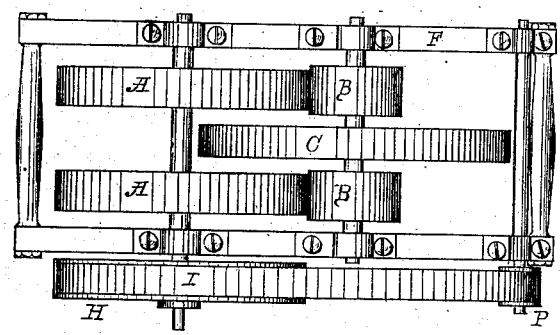

Figure 1 is a side view of the machine. Fig. 2 is a top view of the machine.

Similar letters refer to similar parts throughout the several views.

A A and B B are large and small friction-wheels; C, a fly-wheel; S, any shaft selected to carry the wheels A A; N, a shaft on which are placed B B and fly-wheel C. (See Fig. 2.)

The attachment and use of my invention to machinery may be understood and constructed as follows: Having the machine all complete to which the triple-wheel power is to be attached, we select the shaft S, (which may be any shaft of the machine,) and on any part of which we place the larger wheels A A, with sufficient space between them for the fly-wheel C. (See Fig. 2.) Then on a shaft, N, (not yet a part of the machine,) place the fly-wheel C and the smaller wheels B B—same distance apart as A A—as seen in Fig. 2. Now construct a suitable frame to support the bearings of the shaft N in such a position that the perimeters of wheels A A and B B will be in contact. (See Fig. 2.) This gives great velocity to the fly-wheel, hence power, without increasing the velocity in any part of the machinery.

I prefer so to construct the wheels A A and B B that they will turn toward each other when in operation. It may be constructed by using only one set of wheels A and B, otherwise substantially as above specified.

I prefer to have the wheels A A and B B smooth-faced, so they may slip in case of sudden stopping or great resistance before breaking the machinery.

I am aware that fly-wheels and systems of wheels have been used in operating machinery long prior to my invention. Therefore I do not claim such a combination, broadly; but What I do claim, and desire to secure by Letters Patent, is—

The combination of the larger and smaller wheels A A and B B, fly-wheel C, and shaft N, as herein described, and for the purposes all as substantially set forth.

Rolla, Mo., January 7, 1881.

LEVI A. WILSON.

Witnesses:
WM. SCOTT,
R. S. JOHNSON.